May 12, 1931.                D. HAWLEY                 1,805,089
                          RADIO TESTING DEVICE
                   Filed April 23, 1926    2 Sheets-Sheet 1

May 12, 1931.  D. HAWLEY  1,805,089
RADIO TESTING DEVICE
Filed April 23, 1926   2 Sheets-Sheet 2

Inventor
Douglass Hawley
By his Attorneys

Patented May 12, 1931

1,805,089

UNITED STATES PATENT OFFICE

DOUGLASS HAWLEY, OF MINNEAPOLIS, MINNESOTA, ASSIGNOR TO JEWELL ELECTRICAL INSTRUMENT COMPANY, OF CHICAGO, ILLINOIS, A CORPORATION OF ILLINOIS

RADIO TESTING DEVICE

Application filed April 23, 1926. Serial No. 104,044.

My invention is directed primarily to a simple and highly efficient device or apparatus for testing the various circuits of radio receiving sets, but is capable of other uses, as will hereinafter more fully appear. The testing device is of such character that, when used in connection with radio receiving sets, it will indicate the condition of the various circuits, such as the grid circuit, the plate circuit, and the filament circuit. The device will also test the bias voltage at the socket, the condition of the grid condenser and "grid leak", the plate voltage at the socket, the filament voltage with the tube in operation, and the tube emission with the tube in operation. Moreover, it will test tubes for emission, under varying grid biases; it will test the condition of the A, B, C or D batteries as to their polarity, voltage or amperage; it will determine if the tube elements are shorted internally and, if so, what elements are so effected; it will test resistance and condition of the phones, of the loud speaker, or the transformer; it will compare the resistance in one set with that of another.

In the accompanying drawings, the improved testing device is diagrammatically illustrated, and I have also illustrated diagrammatically a radio receiving set of a well known simple type.

Referring to the drawings.

Figure 1:
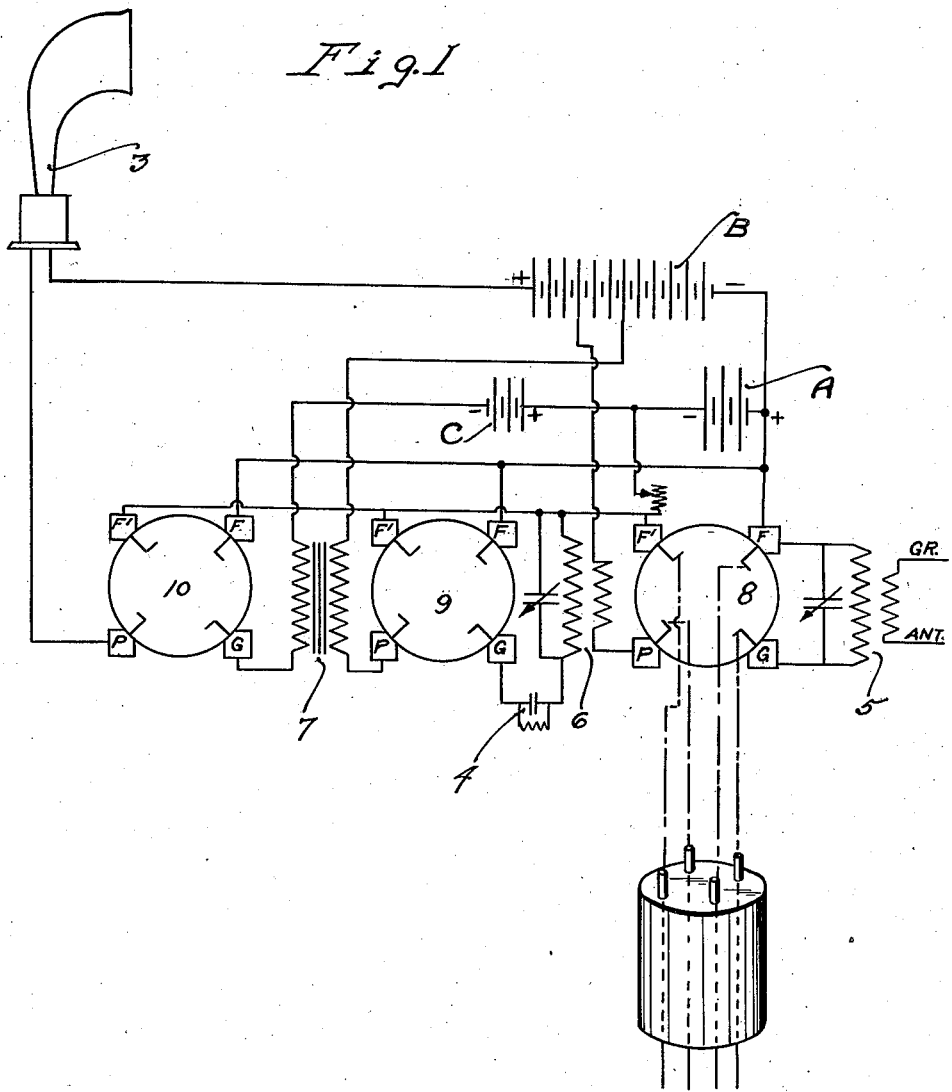
Fig. 1 is a diagrammatic view of the radio receiving set.

Of the parts of the radio receiving set diagrammatically illustrated in Fig. 1, it is desirable for the purposes of this case to particularly note only the following elements, to wit: A battery A, B battery B, C battery C, loud speaker 3, "grid leak" and condenser 4, antenna coupler 5, radio frequency transformer 6, audio frequency transformer 7, and sockets 8, 9 and 10. These sockets have the customary contacts, to wit: the grid contacts G, plate contacts P, and filament contacts F and F', of which F' may be assumed to be the negative contact.

The testing apparatus, as its chief elements includes a battery 11, a socket 12, a meter 13, preferably a combined voltameter and a milliammeter, and a plug 14, said parts being associated with circuits, switches and co-operating devices, as will now be described.

In this particular instance, the battery 11 may be assumed to be a four and one-half volt source. The socket 12 is or may be assumed to be a duplicate of one of the sockets 8, 9, or 10 illustrated diagrammatically in Fig. 1 and, consequently, the socket contacts are correspondingly marked. The plug 14 has four contacts $g$, $p$, $f$ and $f^3$. This plug 14 is of the same size as the base of a radio tube and its contacts are correspondingly arranged, so that it will fit in any one of the sockets as a substitute for the tube, thereby bringing the circuits of the set to the testing device. Main lead wires or bus bars $g'$, $p'$, $f'$ and $f^2$ lead, respectively, from the plug contacts $g$, $p$, $f$ and $f^3$. The leads $f'$ and $f^2$ are connected directly to the contacts F and F' of the socket 12. Main leads or bus bars 15 and 16 lead, respectively, from the meter 13, the lead 15 being the common negative and the lead 16 being a milliammeter lead. The numerals 17 and 18 indicate, respectively, low voltage and high voltage leads or bus bars that extend from the meter 13. The lead 18 also serves as a low reading milliammeter lead. Main leads or bus bars 19 and 20 extend, respectively, from the negative and positive sides of the battery. Main leads or bus bars 21 and 22 extend, respectively, from the contacts G and P of the socket 12.

Figure 2:
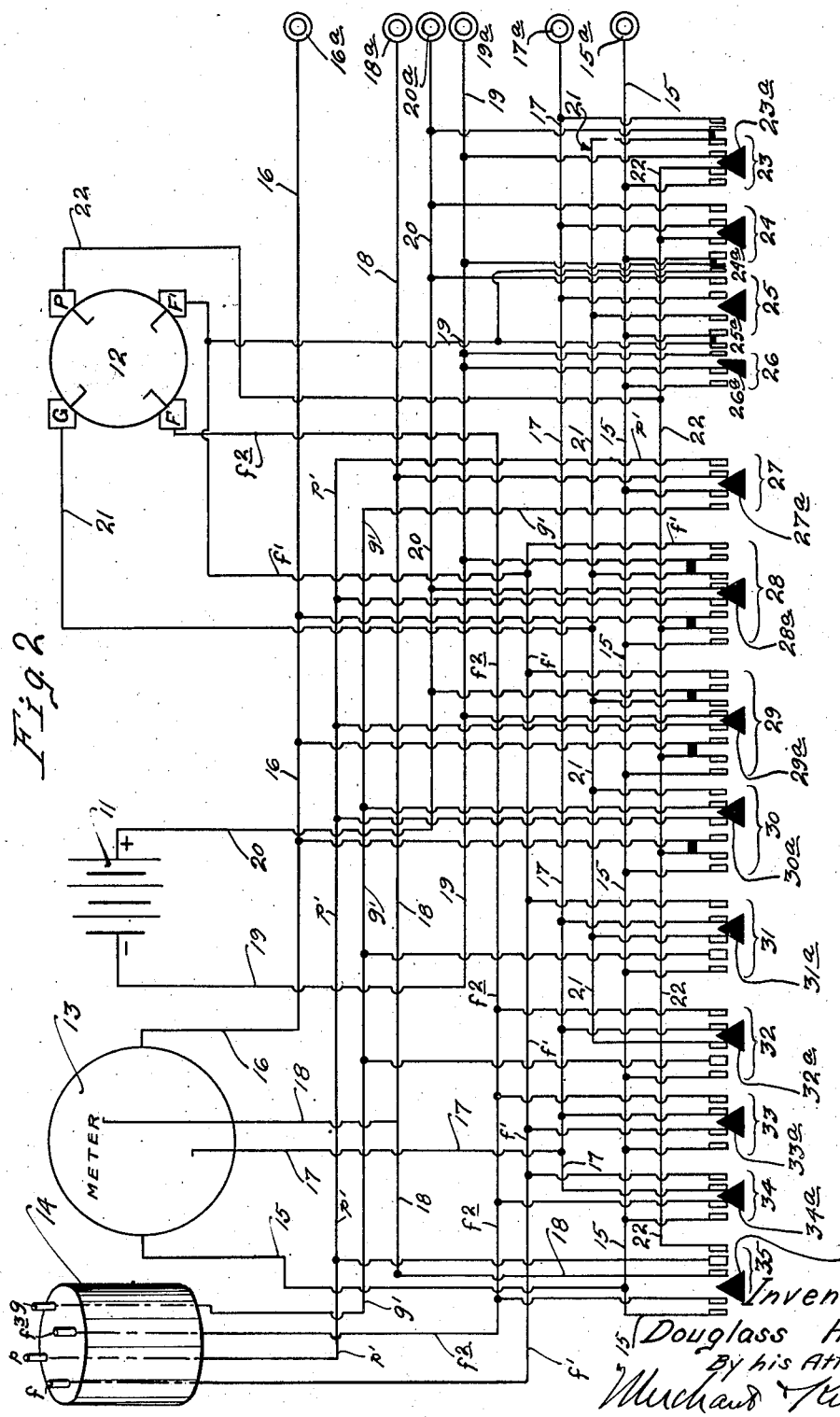
Fig. 2 is a diagrammatic view of the testing device.

The several switches for making the various tests are diagrammatically illustrated in Fig. 2 and, as illustrated, said switches are arranged in thirteen groups. The several groups of switch contacts will be considered progressively from the right toward the left. The first group 23 consists of four contacts connected, respectively, to the bus bars 21, 19, 22 and 15. The second group consists of four normally separated contacts 24 connected, respectively, to the bus bars 20, 17, 22 and 15. The third group 25 consists of four contacts connected, respectively, to the bus bars 20, 17, 21 and 15. The fourth group 26 consists of two normally separated contacts connected, respectively, to the bus bars 19 and 15. The fifth group 27 consists of four contacts connected, respectively, to the bus bars $p'$, 18, 15 and $g'$. The sixth group 28 consists of eight normally separated contacts connected, respectively, to the bus bars $f'$, 19, 21, 20, $p'$, 16, 22 and 15. The seventh group 29 consists of eight normally separated contacts connected, respectively, to the bus bars $f'$, 20, 21, 19, $p'$, 16, 22 and 15. The eighth group 30 consists of six normally separated contacts connected, respectively, to the bus bars 21, $g'$, $p'$, 16, 22 and 15. The ninth group 31 consists of five normally separated contacts connected, respectively, to the bus bars $f'$, 17, 21, $g'$ and 15. The tenth group 32 consists of five contacts connected, respectively, to the bus bars $f^2$, 17, 21, $g'$ and 15. The eleventh group 33 consists of four contacts connected, respectively, to the bus bars $f^2$, 17, $f'$ and 15. The twelfth group 34 consists of four contacts connected, respectively, to the bus bars $f'$, 17, $f^2$ and 15. The thirteenth group 35 consists of five contacts connected, respectively, to the bus bars 22, $p'$, 18, $f^2$ and 15.

As shown and preferred, the bus bars 16, 18, 20, 19, 17 and 15 are extended to and terminate in contacts of the character usually designed as "tip jacks", indicated by the same numbers as the bus bars themselves, but with the exponent $a$ added.

The triangular black marks on Fig. 2 are intended to indicate wedges of insulating material operative on the several groups of switch contacts, the wedges for the several switches being indicated by the same characters with the added exponent $a$. In some of the groups, insulating material is placed between certain of the contacts so that the said contacts are arranged to operate in pairs.

The switch 23 is for making tests for grid-plate shorts; the switch 24 is for making tests for plate-filament shorts; the switch 25 is for making tests for grid-filament shorts; the switch 26 is for making tests for continuity; the switch 27 is for testing for grid leak and condenser; the switch 28 is for testing emission of the tube with negative grid bias; the switch 29 is for testing for emission of the tube with positive grid bias; the switch 30 is for testing for emission of the tube as used in the set; the switch 31 is for testing the grid bias at the socket; the switch 32 is for making the same test as the switch 31, but with the filament connection reversed; the switch 33 is for making test for the filament voltage; the switch 34 is for making the same test as the switch 33, but with the meter connections reversed; and the switch 35 is for testing the plate voltage.

For the first four tests controlled by the switches 23, 24, 25 and 26, it is not necessary to have to insert the plug 14 in either of the sockets 8, 9 or 10 of the receiving set, but for the tests controlled by the switches 28, 29 and 30, the tube to be tested will be inserted in the socket 12 of the testing device. For other tests, that is, for testing the condition of the set, the plug 14 must be inserted in one or the other of the sockets 8, 9 or 10.

When the switch 23 is operated by the wedge 23$^a$, the bus bar 19 will be connected to the bus bar 21 and the bus bar 15 will be connected to the bus bar 22; and if a voltameter reading on the meter is then shown, it will indicate that the grid and plate are shorted in the tube applied in the socket 12.

When the switch 24 is operated by pressure from the wedge 24$^a$, the bus bar 20 will be connected to the bus bar 17 and the bus bar 22 will be connected to the bus bar 15; and if the meter 13 then shows a reading, it will indicate that the plate is shorted to the filament.

When the switch 25 is operated by the wedge 25$^a$, the bus bar 20 will be connected to the bus bar 17 and the bus bar 21 will be connected to the bus bar 15; and if the meter 13 then shows a reading, it will indicate that the grid and the filament are shorted.

When the switch 26 is to be operated, the tip jacks 17$^a$ and 20$^a$ should be connected by a circuit whose continuity is to be tested, and then when the wedge 26$^a$ is pressed, the bus bars 19 and 22 will be connected and if the meter 13 shows a reading, it will indicate that the circuit being tested is continuous.

In tests made by the switches 27 to 35, inclusive, the plug 14 will be inserted in one or the other of the sockets 8, 9 or 10 of the receiving set. In making the test by the switch 27, the plug 14 must be in the socket 9, but in making the other tests, the plug may be in the one or the other of the sockets 8, 9 or 10, depending upon which circuits are to be tested. When the wedge 27$^a$ is pressed, the bus bar 18 will be connected to the bus bar $p'$ and the bus bar 15 will be connected to the bus bar $g'$, and then if the meter 13 shows the proper reading, it will indicate that both the grid leak and condenser are not open, but if there is no reading, it will be because there is an open circuit.

When the wedge 28$^a$ is pressed, the contacts of the switch 28 will be engaged so that the bus bar $f'$ will be connected to the bus bar 19, the bus bar 21 will be connected to the bus bar 20, the bus bar $p'$ will be connected to the bus bar 16, and the bus bar 22 will be connected to the bus bar 15; and the reading of the meter will then show the emission in milliamperes of the tube with a negative bias.

When the wedge 29ª is pressed, the contacts of the switch 29 will be engaged so that the bus bar $f'$ will be connected to the bus bar 20, the bus bar 21 will be connected to the bus bar 19, the bus bar $p'$ will be connected to the bus bar 16, and the bus bar 22 will be connected to the bus bar 15; and the reading of the meter 13 will then show the emission of the tube in milliamperes with a positive bias.

When the wedge 30ª is pressed, the contacts of the switch 30 will be engaged so that the bus bar 21 will be connected to the bus bar $g'$, the bus bar $p'$ will be connected to the bus bar 16, and the bus bar 22 will be connected to the bus bar 15; and the reading on the meter 13 will show the emission of the tube as in actual use in the set.

When the wedge 31ª is pressed, the contacts of the switch 31 will be engaged so that the bus bar $f'$ will be connected to the bus bar 17 and the bus bar 21 will be connected to the bus bars $g'$ and 15; and the reading on the meter 13 will then show the bias voltage at the socket when the grid return is to $f'$.

When the wedge 32ª is pressed, the contacts of the switch 32 will be engaged so that the bus bar $f^2$ will be connected to the bus bar 17 and the bus bar 21 will be connected to the bus bars $g'$ and 15; and the reading on the meter 13 will then show the bias voltage at the socket when the grid return is to $f^2$.

When the wedge 33ª is pressed, the contacts of the switch 33 will be engaged so that the bus bar $f^2$ will be connected to the bus bar 17 and the bus bar $f'$ will be connected to the bus bar 15; and the meter 13 will then give the filament voltage reading.

When the wedge 34ª is pressed, the contact switch 34 will be engaged so that the bus bar $f'$ will be connected to the bus bar 17 and the bus bar $f^2$ will be connected to the bus bar 15; and the meter 13 will then show the filament voltage reading. The switch 33 or 34 will be used according to the connection of the A battery to the socket.

When the wedge 35ª is pressed, the contacts of the switch 35 will be engaged so that the bus bar 22 will be connected to the bus bars $p'$ and 18, and the bus bar $f^2$ will be connected to the bus bar 15; and the reading on the meter 13 will then show the plate voltage at the socket.

In the drawings, only meter 13 is used for the several different purposes, but, of course, more than one meter might be coupled and the several meters used for different tests or indications.

The number of groups of switch contacts may be varied according to the number of different tests that it may be desired to make and, of course, any suitable switch-operating devices may be used for forcing together the contacts of each particular group.

Instead of permanently connecting the the battery as a part of the set, the battery might, of course, be temporarily connected.

It is, of course, understood that in making the above tests as to the condition of the several circuits of the receiving set, it has been necessary to have the batteries of the set connected in the respective circuits.

What I claim is:

1. A testing device of the kind described comprising a plug adapted to be inserted into a socket of an electron tube circuit and having contacts corresponding to those of the removed tube, the contacts of said plug having leads corresponding to the socket contacts, an indicating meter having leads, a socket forming part of the testing apparatus and having connection with the leads extended therefrom, and a plurality of switches, each switch involving a plurality of contacts and the contacts of said switches having leads, certain of which are connected to the several leads above noted, certain of the switch contacts and their leads being arranged for testing of the condition of the several circuits of the electron tube circuit and certain thereof being arranged for testing the condition of a tube inserted in the socket of said testing device, the condition of the tested circuits and the tube to be tested being indicated on said meter.

2. A testing device of the kind described comprising a plug adapted to be inserted into a socket of an electron tube circuit and having contacts corresponding to those of the removed tube, the contacts of said plug having each its own lead, an indicating meter having a plurality of independent leads, and a plurality of independent switches, each involving a plurality of contacts, said contacts having leads differentially connected to the several leads enumerated, one switch being arranged to test the grid bias, another to determine the condition of the grid leak and condenser, another of said switches being arranged to test the filament voltage, another of said switches to test the plate voltage, and a means in connection with said testing device for enabling certain tests to be made under conditions that would exist in the circuit being tested if a tube was not removed therefrom.

3. A testing device of the kind described comprising a plug adapted to be inserted into a socket of an electron tube circuit and having contacts corresponding to those of the removed tube, the contacts of said plug having each its own lead, a socket having contacts corresponding to those of a tube socket in the circuit to be tested and adapted to receive the contacts of a tube removed from the circuit to be tested, said socket contacts having leads, an indicating meter having bus bar leads, and switches, each involving a plurality of switch contacts, said switch contacts having leads differentially connected to the several leads enumerated, one switch being arranged to test the grid bias and another to determine the condition of the grid leak and condenser, another of said switches being arranged to test the filament voltage, another to test plate voltage, and another of said switches being arranged to test for emission of the tube, the said socket in the testing apparatus enabling a tube removed from the circuit being tested to be inserted therein and coupled back into the circuit being tested thereby permitting tests to be made with respect to conditions that prevail in the circuit under operating conditions thereof.

4. A testing apparatus for electron tube circuits including a local testing circuit adapted for use with a remote circuit to be tested and a source of potential, an indicating meter, a plurality of connections, means connecting said connections with said remote circuit to be tested, a plurality of independent switches for alternately establishing connection between said remote circuit to be tested, said indicating meter, and said local testing circuit, said remote circuit to be tested including the circuit connections of an electron tube system, and said local testing circuit further including the elements of an electron tube adapted for use in the circuit being tested whereby the conditions prevailing in the circuits of said electron tube system, under operating conditions thereof, may be determined.

5. A testing device including leads connectable to certain of the tube element leads in an electron tube circuit to be tested when a tube is removed therefrom, means connectable to certain of said leads for producing a load or drain effect on the circuit to be tested equal to that of a tube removed therefrom, and indicating meter means connectable to certain of said leads, thereby permitting the measurement of voltage and current flow that would exist in the circuit of a removed tube if the removed tube were in operating position in the circuit.

6. A testing apparatus for use with an electron tube circuit to be tested including a plug having contacts corresponding to those of a tube in a circuit to be tested and connectable to the circuit contacts of a tube socket in the circuit to be tested when a tube is removed therefrom, a socket having contacts corresponding to those of a socket in the circuit to be tested and adapted to receive the contacts of a tube removed from the circuit to be tested, leads arranged to connect the contacts of the plug with the contacts of the socket in the testing apparatus whereby when the contacts of the tube equal to that of a tube removed from the socket of a circuit to be tested is placed in the socket in the testing apparatus, a drain or load effect on the circuit being tested will be produced that is equal to the drain or load effect thereon when the removed tube is in the socket of the circuit being tested, and electrical measuring means arranged for connection to said leads thereby permitting the measurement of voltages and current flow at the socket of the circuit to be tested that would exist under operating conditions.

7. A testing device for use with a remote circuit to be tested including a means for producing the drain or load effect, on a circuit, of a tube in the circuit to be tested, leads from said means arranged for connection to the remote circuit to be tested when a tube is removed therefrom, electrical measuring means arranged for connection with certain of said leads thereby permitting the measurement of voltages and current flow in the circuit being tested equal to the voltage and current flow existing therein when the removed tube is in its place.

8. A testing device for testing remote electron tube circuits including a plug having contacts corresponding to those of an electron tube in the circuit to be tested and coupled to the circuit contacts of a tube socket in the circuit to be tested when a tube is removed therefrom, a socket in the testing device having contacts corresponding to those of a socket in the circuit to be tested and adapted to receive a tube removed from the circuit to be tested, leads for establishing contact between the plug contacts and the contacts of the socket in the testing apparatus whereby, when a plug is inserted into the socket of a removed tube in the circuit to be tested, and elements equal to those of the removed tube are connected to the corresponding contacts of a socket in the testing apparatus, drain or load effect on the circuit being tested will be produced that is equal to the drain or load effect thereon under operating conditions, electrical measuring means, and switch means for alternately connecting said measuring means between the plate and a filament lead for testing the plate voltage between the filament leads for testing the filament voltage, and between the grid lead, and a filament lead for testing the grid bias voltage.

9. A testing device of the character set forth comprising a support having a vacuum tube socket and an electrical indicating instrument mounted thereon, a contact plug separate from said support, and connections between said plug, socket and indicating instrument, said plug being adapted to engage the contacts of a vacuum tube socket of a radio set.

10. A testing device of the character set forth comprising a support having a vacuum tube socket, voltmeter and a milliammeter mounted thereon, a contact plug adapted to engage the contacts of a vacuum tube socket of a radio set, flexible leads connecting said plug with said support, circuits including said leads, first mentioned socket, voltmeter and milliammeter, means for connecting the meters in said circuit to indicated voltage or milliamperes between predetermined contacts of the first mentioned socket.

11. In a testing device for audion circuits, the combination of a connector member adapted to be connected to an audion tube socket and having a plurality of contacts for engagement with the contacts of the socket, conductors leading from said connector contacts, and an electrical measuring instrument connected to predetermined conductors and adapted to determine the voltage conditions existing at the corresponding predetermined contacts of said audion tube socket.

12. In a testing device for audion circuits, the combination of an electrical connector adapted to be engaged with an audion tube socket and having contacts corresponding to the filament and plate terminals of an audion tube, leads from said contacts, an electrical measuring instrument associated with said connector, and selective switching means for connecting said measuring instrument to measure open circuit socket filament voltage or open circuit socket plate voltage.

13. In a testing device for audion circuits, the combination of an electrical connector adapted to be engaged with an audion tube socket and having contacts corresponding to the filament and grid terminals of an audion tube, leads from said contacts, an electrical measuring instrument associated with said connector, and selective switching means for connecting said measuring instrument to measure open circuit socket filament voltage or open circuit socket grid voltage.

14. In a testing device for audion circuits, the combination of an electrical connector adapted to be engaged with an audion tube socket and having contacts corresponding to the plate and grid terminals of an audion tube, leads from said contacts, an electrical measuring instrument associated with said connector, and selective switching means for connecting said measuring instrument to measure open circuit socket plate voltage or open circuit socket grid voltage.

15. In a testing device for audion circuits, the combination of an electrical connector adapted to be engaged with an audion tube socket and having contacts corresponding to the grid, plate and filament terminals of an audion tube, leads from said contacts, electrical measuring means associated with said connector, and selective switching means for connecting said measuring instrument to measure open circuit socket filament voltage, open circuit socket plate voltage or open circuit socket grid voltage.

16. The method of testing audion tube circuits with a testing device having a test connector, meter and socket contacts which comprises connecting the test connector of the testing device to a socket of the audion tube circuit, placing an electron tube in the socket of the testing device, operating the circuit, and determining the electrical condition of the circuit under predetermined current flow conditions.

17. The method of testing receiving sets employing audion tubes with a tester having a test connector, socket and meter, which comprises removing an electron tube from the set, substituting the test connector of the testing device, placing an electron tube in the socket of the testing device, operating the receiving set with the tube in the testing device, and measuring predetermined electrical conditions in the receiving set under operation.

18. The method of testing receiving sets employing audion tubes with a tester having a test connector, socket and meter, which comprises removing an electron tube from the set, substituting the test connector of the testing device, placing an electron tube corresponding to the removed tube in the socket of the testing device, operating the receiving set with the tube in the testing device, and measuring predetermined electrical conditions in the receiving set under operation.

19. In a testing device for audion circuits, the combination of a connector member adapted to be connected to an audion tube socket and having a plurality of contacts for engagement with the contacts of the socket, conductors leading from said connector contacts, means for producing a current flow equivalent to an operating condition in one of said audion circuits, and an electrical meauring instrument adapted to determine the electrical conditions in the circuits under such operation.

20. In a testing device for audion circuits, the combination of a connector member adapted to be connected to an audion tube socket and having a plurality of contacts for engagement with the contacts of the socket, conductors leading from said connector contacts, means for producing a current flow, voltage and current measuring means for determining voltage conditions existing at certain contacts of said audion tube socket, and for determining current flow between predetermined of said contacts, and selective switch means for connecting said measuring means between predetermined contacts.

21. In a testing device for audion circuits, the combination of an electrical connector adapted to be engaged with an audion tube socket and having contacts corresponding to terminals of an audion tube, leads from said contacts, an auxiliary audion tube socket associated with said connector, an electric measuring instrument associated with said connector, and selective switching means for connecting said measuring instrument to measure filament voltage with the audion circuit under load operation.

22. In a testing device for audion circuits, the combination of an electrical connector adapted to be engaged with an audion tube socket and having contacts corresponding to terminals of an audion tube, leads from said contacts, an auxiliary audion tube socket associated with said connector, an electric measuring instrument associated with said connector, and selective switching means for connecting said measuring instrument to measure grid voltage under load.

23. In a testing device for audion circuits, the combination of an electrical connector adapted to be engaged with an audion tube socket and having contacts corresponding to terminals of an audion tube, leads from said contacts, an auxiliary audion tube socket associated with said connector, an electric measuring instrument associated with said connector, and selective switching means for connecting said measuring instrument to measure plate voltage under load.

24. In a testing device for audion circuits, the combination of an electrical connector adapted to be engaged with an audion tube socket and having contacts corresponding to terminals of an audion tube, leads from said contacts, an auxiliary audion tube socket associated with said connector, an electric measuring instrument associated with said connector, and selective switching means for connecting said measuring instrument to measure plate voltage, grid voltage or filament voltage under load.

25. In a testing device for electron tube circuits, the combination of electrical measuring means for determining voltage and current conditions in the audion circuit, with a socket for receiving an audion tube, conductor means extending from said socket, and connection means having contacts corresponding to the terminals of an audion tube for connecting the device to the audion socket of the audion circuit whereby the audion circuits may be tested with the audion in operation in the circuits.

26. In a testing device for electron tube circuits, the combination of electrical measuring means for determining voltage and current conditions in the audion circuit, with a socket for receiving an audion tube, conductor means extending from said socket, connection means having contacts corresponding to the terminals of an audion tube for connecting the device to the audion socket of the audion circuit whereby the audion circuits may be tested with the audion in operation in the circuits, and auxiliary connectors and leads to said electrical measuring means whereby the measuring means may be connected to external circuits.

27. In a testing device for electron tube circuits, the combination of electrical measuring means for determinng voltage and current conditions in the audion circuit, with a socket for receiving an audion tube, conductor means extending from said socket, connection means having contacts corresponding to terminals of an audion tube for connecting the device to the audion socket of the audion circuit whereby the audion circuits may be tested with the audion in operation in the circuits, auxiliary binding posts and leads to said electrical measuring means whereby the measuring means may be connected to external circuits, and selective switch means for controlling the connection of said measuring means to said audion circuits.

28. In a testing instrument for audion tube circuits, the combination of a connector adapted to be engaged with an audion tube socket, conductors leading from said connector, a socket for receiving the audion tube, meter means having a high voltage and a low voltage range, switch means for connecting said high voltage meter means across the plate circuit or said low voltage meter means across the filament circuit, a low voltage battery carried by said testing instrument, and switch means for controlling the connection of said battery in series with said low voltage meter means.

29. In a testing instrument for detecting electrode short circuits in audion tubes, the combination of an audion tube socket, with a vacuum tube of the audion type, a low voltage battery and an electric meter adapted to indicate short circuit of said battery, circuits extending from the socket contacts, and selective switch means for connecting predetermined electrodes in series with said battery and meter to short circuit the battery through contacts corresponding to predetermined electrodes and determine the presence of electrode short circuits.

30. In a testing instrument for detecting electrode short circuits in audion tubes, the combination of an audion tube socket, with a vacuum tube of the audion type, a low voltage battery and an electric meter adapted to indicate short circuit of said battery, circuits from the contacts of the socket and selective switch means for connecting the plate and filament, the plate and grid or the grid and filament respectively, in series with said battery and meter to determine the presence of electrode short circuits.

31. In a device of the class described, the combination of a test connector adapted to be inserted in the socket of an electron tube circuit and having contacts corresponding to those of a tube with conductors leading from certain contacts of said test connector, an auxiliary socket for receiving the tube to be energized from said socket, a standard source of electromotive force carried by said tester for impressing an additional increment of electromotive force on the grid, and an electrical measuring instrument for determining the plate current under such condition.

32. In a device of the class described, the combination of a test connector adapted to be inserted in the socket of an electron tube circuit and having contacts corresponding to those of a tube with conductors leading from certain contacts of said test connector, an auxiliary socket for receiving the tube to be energized from said socket, a standard source of electromotive force carried by said tester for impressing an additional increment of electromotive force on the grid, an electrical measuring instrument for determining the plate current under such condition, auxiliary binding posts for said standard source, and selective switch means for disconnecting said source from said conductors and connecting said measuring instrument with said binding posts for continuity tests.

33. In a testing device for audion circuits, the combination of an electrical connector adapted to be engaged with an audion tube socket and having contacts corresponding to plate and grid contacts of a tube, leads from said contacts, an electric indicating device, and means for connecting said device across the plate and grid terminals of said test connector to indicate the condition of a grid leak.

34. In a testing device for audion circuits, the combination of an electrical connector adapted to be engaged with an audion tube socket and having contacts corresponding to grid and plate terminals of a tube, leads from said contacts, an auxiliary audion tube socket associated with said connector, an electrical measuring instrument associated with said connector, and means for connecting said measuring instrument across the grid and plate contacts of said connector to measure the resulting current and determine the condition of a grid leak and condenser.

35. In a testing device for audion circuits, the combination of an electrical connector adapted to be engaged with an audion tube socket and having contact terminals, flexible leads from said contacts, an audion tube socket connected to said leads, a plurality of electrical measuring instruments associated with said connector, and selective switching devices for connecting said measuring instruments to measure plate current or filament voltage under load.

36. In a testing device for audion circuits, the combination of an electrical connector adapted to be engaged with an audion tube socket and having contact terminals, flexible leads from said contacts, an audion tube socket, a plurality of electrical measuring instruments associated with said leads, and selective switching devices for connecting said measuring instruments to measure plate current or plate voltage at said latter socket under load.

37. In a testing device for audion circuits, the combination of an electrical connector adapted to engage contacts of an audion tube socket, with flexible leads from said contacts, an auxiliary socket energized by said leads, a plurality of electrical measuring instruments, and selective switching devices for connecting said measuring instruments to measure plate current or grid voltage at said auxiliary socket under load.

In testimony whereof I affix my signature.

DOUGLASS HAWLEY.